United States Patent [19]

Herbert et al.

[11] 4,068,864

[45] Jan. 17, 1978

[54] SINGLE ELEMENT FLEXIBLE CONNECTION

[75] Inventors: John T. Herbert; Frank J. Kovitch, both of Arlington; Paul E. Sullivan, Euless, all of Tex.; Stanley P. Vitt, Redlands, Calif.

[73] Assignee: Murdock Machine & Engineering Company, Irving, Tex.

[21] Appl. No.: 701,088

[22] Filed: June 30, 1976

[51] Int. Cl.² ............................................ F16L 11/12
[52] U.S. Cl. .................................... 285/49; 285/167; 285/234; 285/263
[58] Field of Search ........... 285/49, 51, 137 R, 137 A, 285/234, 263, 261, 223, 131, 135, 136, 55, 166, 167, 334.3

[56] References Cited

U.S. PATENT DOCUMENTS

| 1,782,484 | 11/1930 | Spencer et al. | 285/167 |
|---|---|---|---|
| 3,165,339 | 1/1965 | Follow | 285/263 |
| 3,680,895 | 8/1972 | Herbert et al. | 285/167 |
| 3,734,546 | 5/1973 | Herbert et al. | 285/49 |
| 3,848,899 | 11/1974 | Smith | 285/167 |
| 3,853,337 | 12/1974 | Herbert et al. | 285/49 |

Primary Examiner—Dave W. Arola
Attorney, Agent, or Firm—Richards, Harris & Medlock

[57] ABSTRACT

A flexible pipe line joint having an annular housing with a central cavity in which a nipple is partially submerged. The nipple has a flared end on the submerged portion to the inner surface of which an elastomeric ring is adhered. The ring is internally contoured spherically with reference to a common center point spaced from the flared end and located on the longitudinal axis of the joint. An elastomeric body has an assembly of embedded concentric spherical rings and is adhered to the outer surface of the flared end. The spherical rings are contoured and positioned in symmetry to the common center point. A collar secured to the housing encircles the nipple and engages the outer surface of the elastomeric body to maintain the body in position. Support structure secured to the housing has an outward facing spherical surface mating in sliding relation with the internal surface of the first elastomeric body.

14 Claims, 4 Drawing Figures

SINGLE ELEMENT FLEXIBLE CONNECTION

This invention relates to a flexible joint for pipelines, and more particularly to a simplified construction which has an extended life relative to prior systems and in which a singly bonded elastomeric body is secured to a flared nipple and shaped and positioned to cooperate with an annular housing having a central cavity in which the nipple is partially submerged.

In prior U.S. Pat. No. 3,734,546 a flexible pipe connection is illustrated which in many respects is similar to the present invention. The present invention significantly simplifies the construction procedures necessary to form a flexible joint embodying the present invention and extends the useful life compared to those of prior art systems. As in the prior art, a housing and nipple are interconnected by an elastomeric seal assembly. However, in the present system, rather than two elastomeric seal assemblies, a single elastomeric assembly is employed which provides operation superior to that of the prior art.

More particularly in accordance with the present invention, a flexible joint is provided for pipelines. An annular housing is provided with a central cavity and has a nipple partially submerged therein with the nipple having a flared end on the submerged portion. A first elastomeric ring is adhered to the inner surface of the flared end and is internally contoured spherically with reference to a common center point located in the region of the plane of the flared end and located on the longitudinal axis of the joint. An elastomeric body having an assembly of concentric spherical rings embedded therein is adhered to the outer surface of the flared end of the nipple and has the sections contoured and positioned in symmetry to the common center point. A collar encircles the nipple and is adhered to the outer surface of the elastomeric body. Structure is then provided as part of the housing to have an outward facing spherical surface mating in sliding relation with the internal surface of the first elastomeric body. Means are then provided for securing the collar to the housing so that the nipple may flex around the center relative to the body.

The novel features believed characteristic of the invention are set forth in the appended claims. The invention itself, however, as well as further objects and advantages thereof, will best be understood by reference to the following detailed description of an illustrative embodiment taken in conjunction with the accompanying drawings, in which:

Figure 1:
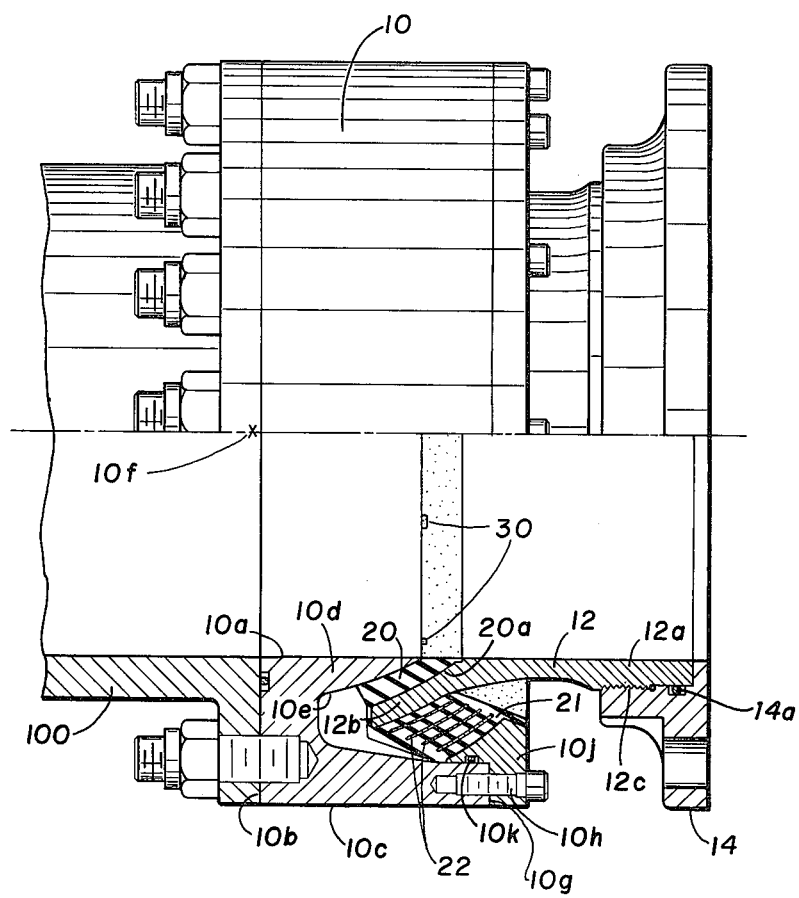
FIG. 1 is an elevational view partially in section showing construction involved in the present invention.

Referring now to FIG. 1, an annular housing 10 has a central aperture wall 10a extending therethrough and is provided with a ring of threaded ports in the face 10b thereof to receive stud bolts which serve to connect housing 10 to an adjoining pipe section 100. The internal diameter of the central wall 10a conforms with the internal diameter of the pipe section 100.

The housing 10 has an outer cylindrical extension 10c and an inner annular lip 10d. The lip 10d has an outer surface 10e which is of spherical shape relative to the center of curvature 10f. The extension 10c has a ring of threaded apertures in the face 10g opposite face 10b to receive a set of studs 10h which serve to secure a ring 10j thereto.

A nipple 12 has a flared end 12b and an internal bore defined by wall 12a which corresponds to the internal wall 10a in body 10. The extremity of nipple 12 includes a threaded section 12c which is adapted to be served into an attaching flange 14. An O-ring 14a serves to provide a fluid tight seal between the attaching flange 14 and the nipple 12.

The nipple 12 is provided with a bonded elastomeric rubber system which includes a first rubber ring body 20 which is bonded at the surface 20a to the inner spherical surface of the flared end 12b of nipple 12. Adhered to the outside of the flared end 12b is a body of rubber 21 having a set of spherical rings 22 embedded therein and adhered at the outer edge thereof to the inner spherical surface of the ring 10j. The contact between the inner rubber body 20 and the outer surface 10e of the lip 10d is a sliding contact. A plurality of channels, such as channel 30, are formed in the spherical surface of the body 20 to provide for pressure equalization across body 20. An O-ring 10k is provided between the outer surface of ring 10j and the inner surface of the cylindrical extension 10c. By this means, and by means of the adherence of the body 21 to the flared section 10b and to the ring 10j, a fluid tight seal is provided which permits the nipple 12 to be tilted relative to the housing 10 with the movement being about the center 10f.

The system in which a single bond operation is provided to incorporate rings 22 and to secure bodies 20 and 21 to the flared nipple 12 and to the ring 10j permits greatly simplified constructional operations of the system as compared to prior systems. Further, the provision of a sliding contact between body 20 and lip 10d provides substantially extended life relative to prior systems.

Figure 2:
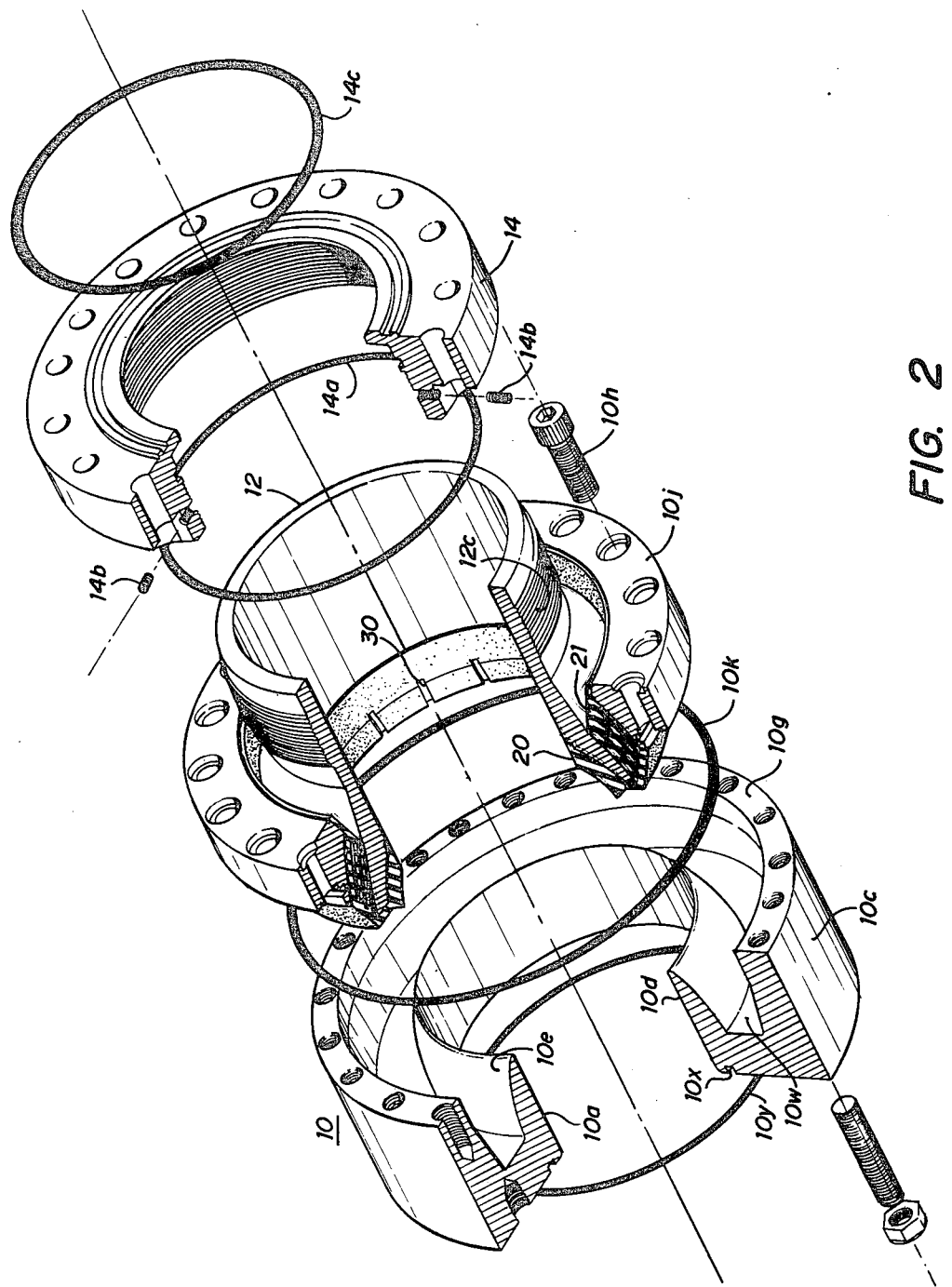
FIG. 2 is an exploded view of the embodiment of FIG. 1.

The structure of FIG. 1 has been illustrated in the exploded view of FIG. 2 wherein like parts have been given the same reference characters as in FIG. 1.

Referring to FIG. 2, the housing 10 is more clearly depicted with the central aperture wall 10a being cylindrical and with lip 10d having the outer curved surface 10e of spherical shape relative to the center of curvature. The flared nipple 12 is positioned with the flared end thereof in the annular well 10w between the outer wall 10c and the lip 10e. The end of the housing 10 opposite the nipple 12 is provided with a groove 10x into which an O-ring 10y is positioned in order to seal the housing to the flange on a pipe 100, FIG. 1. In a similar manner, O-ring 10k is fitted in an outfacing groove on the ring 10j.

The flared nipple 12 is provided with the inner rubber body 20 and the outer elastomeric body 21 applied to the inner and outer surfaces, respectively, of the flared end of the nipple 12 in a single bonding operation. The inner surface of the body 20 is contoured the same as the outer surface 10e of the lip 10d. The inner surface of the rubber body 20 is provided with channels 30 for pressure equalization into annular well 10w and to apply internal pipe pressure to the body 21 to compress the same.

The flange 14 threadedly engages the threaded section 12c of the nipple 12. Set screws 14b are then served through the flange 14 to engage the end of the nipple 12 to lock flange 14 onto nipple 12.

The face of flange 14 is grooved to receive an O-ring 14c for sealing flange 14 to a mating flange on a succeeding pipe section. The number of spherical rings employed in elastomeric body 20 depends upon the angle of deflection to be accommodated, pipe size and pressure. By way of example, connectors have been made and successfully used for operation at 700 psi internal pressure. One embodiment was a ½ inch pipe joint which employed four spherical rings. An embodiment of an 8 inch pipe joint employed nine spherical rings. The deflection accommodated was ±8°.

In a larger unit, an 18¾ inch pipe joint employed nineteen spherical rings and operated at 3000 psi and accommodated a deflection angle of ±10°. The specific requirements for a given installation will dictate variations from the above specific examples.

Thus, in accordance with the invention, a flexible joint is provided for pipelines. An annular housing has a central cavity with a nipple partially submerged therein. The nipple has a flared end on the submerged portion. An elastomeric ring is adhered to the inner surface of the flared end and is internally contoured spherically with reference to a common center point located on the longitudinal axis of the joint. An elastomeric body having an assembly of concentric spherical rings embedded therein is adhered to the outer surface of the flared end of the nipple. The spherical sections are contoured and positioned in symmetry to the common center point. A collar encircles the nipple and is adhered to the outer surface of the elastomeric body to maintain the body in position. Support structure secured to the housing has an outward facing spherical surface mating in sliding relation with the internal surface of the elastomeric ring. Means are provided to secure the collar to the housing to capture the elastomeric body.

Figure 3:
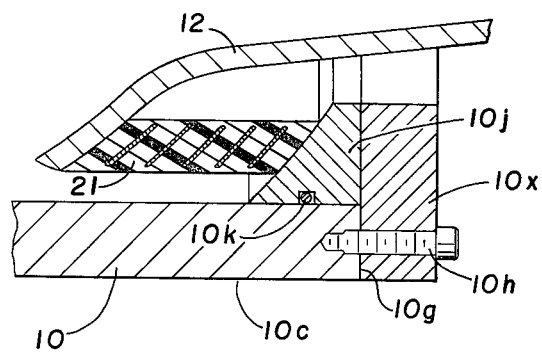
FIG. 3 illustrates a modified capture structure.

In FIGS. 1 and 2, the ring 10j is adhered to the outer surface of elastomeric bearing and is fixed by bolt 10h to the face 10g of the housing. Where the ring 10k is to float rather than be rigidly anchored, the mounting structure can be utilized such as shown in FIG. 3 which illustrates only a portion of the unit. In this embodiment, the same reference characters have been employed as in FIGS. 1 and 2. The elastomeric body adhered to the outer surface of the nipple 12 and to the inner surface of ring 10j serves to transmit internal pressure forces to the housing 10 by way of the capture ring 10z. In this case, the ring 10z is secured to the face 10g of the housing 10 by stud 10h and the ring 10j is then free to float, being sealed to the inner wall of the housing 10 by the O-ring seal 10k.

Figure 4:
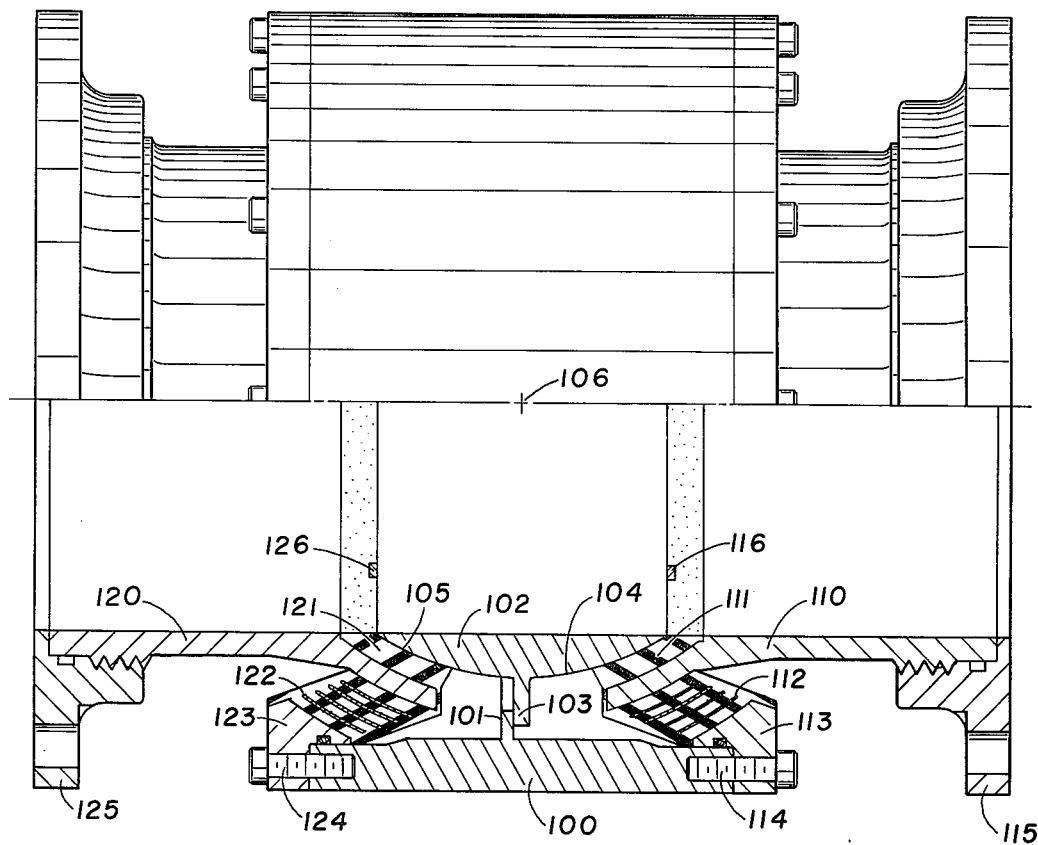
FIG. 4 illustrates a dual joint structure embodying the invention.

FIG. 4 illustrates a modified form of the invention embodying the structure generally as shown in FIGS. 1 and 2 but is a double acting flexible connection. More particularly, in this embodiment, a cylindrical housing 200 is open at both ends and is provided with a central internally projecting flange 101. A ported element 102 is positioned inside housing 200 and has a generally cylindrical outer surface with a radial flange 103 extending from the inner port surface thereof. The outer surfaces 104 and 105 are spherical with reference to the center point 106. A flared nipple 110 is inserted into one end of housing 200 and carries an inner rubber ring 111 which is adhered to the inner spherical surface of the flared end of the nipple 110. An elastomeric seal 112 is adhered to the outer surface of the nipple 110 and to the inner surface of a ring 113. Ring 113 is secured at the end of the housing 200 as by a ring of studs 114 only one of which is shown. A flange 115 threadedly engages the end of the nipple 110 opposite its flared end and provides for coupling the connector to a flow line on the right hand end as viewed in FIG. 4.

An identical structure is provided at the opposite end of the housing 200. More particularly, a second nipple 120 has a rubber ring 121 adhered to the inner surface thereof and an elastomeric seal 122 is adhered to the outer surface of the nipple 120 and to the inner surface of a ring 123. Ring 123 is captured and maintained in place by a ring of studs 124. A flange 125 threadedly engages the end of nipple 120 opposite the flared end and serves to connect the coupling to a flow line leading from the left end as viewed in FIG. 1.

The outer surfaces 104 and 105 of element 102 are spherical with reference to point 106 as above mentioned. Similarly the inner and outer surfaces of the flared end of the nipples 110 and 120 are spherical with reference to point 106. The structural members embedded in the elastomeric seals 112 and 122 similarly are spherical in their configuration relative to point 106 as are the inner surfaces of the rings 113 and 123.

Because two elastomeric elements are mounted in series, each element moves only one-half the total required angular excursion. Thus, for high angular motion requirements, the embodiment of the invention shown in FIG. 4 is preferred. Also since the motion for elastomeric element is reduced by 50% as compared with a single element elastomeric configuration, the torque required to move the elastomer is reduced by 50%. Thus, both nipple flared ends and all the spherical segment shaped reinforcing elements, the outer collar and the elastomeric pads are generated around a common center point 106 on the axis. The center element 102 has an outer spherical contour and positions both of the elastomeric rings 111 and 121. The flange 103 extends radially from element 102 in a plane perpendicular to the axis of the coupling. The flange 103 then contacts the similar inwardly directed flange 101 on the cylindrical housing 200. As in the case of the coupling shown in FIGS. 1-3, the contact between the inner surface of the rubber rings 111 and 121 and the surfaces 104 and 105, respectively, are sliding contacts. Furthermore, in a preferred embodiment of the invention, the inner surface of the rubber rings 111 and 121 are grooved for pressure equalization across the rings 111 and 121. For this purpose, grooves 116 and 126 are provided. It will be appreciated that pressure equalization may also be provided by eliminating grooves 116 and 126 and by providing passages through element 102 adjacent to the flange 103 and on both sides thereof.

Having described the invention in connection with certain specific embodiments thereof, it is to be understood that further modifications may now suggest themselves to those skilled in the art and it is intended to cover such modifications as fall within the scope of the appended claims.

What is claimed is:

1. In a flexible joint for pipelines where an annular housing with a central cavity has a nipple partially submerged therein with said nipple having a flared end on the submerged portion, the combination which comprises:

a. an elastomeric ring adhered to the inner surface of said flared end and internally contoured spherically with reference to a common center point spaced from said flared end and located on the longitudinal axis of said joint, b. an elastomeric body having an assembly of concentric spherical rings embedded therein, with said body adhered to the outer surface of said flared end and with said rings contoured and positioned in symmetry to said common center point,
c. a collar encircling said nipple and engaging the outer surface of said elastomeric body to maintain said body in position,
d. support structure in said housing having an outward facing spherical surface mating in sliding relation with the internal surface of said elastomeric ring, and
e. means to secure said collar to said housing.

2. The combination set forth in claim 1 wherein grooves are formed in the surface of one of said first ring and support structure to equalize pressure across said ring and apply internal pipe pressure to said elastomeric body and other confining areas of the body cavity.

3. The combination set forth in claim 1 in which the inner and outer surfaces of said flared end are concentrically spherical relative to said center point.

4. The combination set forth in claim 2 in which said grooves are formed in the face of said ring.

5. The combination set forth in claim 1 wherein said spherical rings are structural spherical sections.

6. The combination set forth in claim 1 in which said support structure is integral with said housing.

7. In a flexible joint for pipelines where an annular housing with a central cavity has a nipple partially submerged therein with said nipple having a flared end on the submerged portion, the combination which comprises:
a. an elastomeric ring adhered to the inner surface of said flared end and internally contoured spherically with reference to a common center point spaced from said flared end and located on the longitudinal axis of said joint,
b. an elastomeric body having an assembly of concentric spherical rings adhered therein, with said body adhered to the outer surface of said flared end and with said rings contoured and positioned in symmetry to said common center point,
c. a collar encircling said nipple and adhered to the outer surface of said elastomeric body to maintain said body in position,
d. support structure in said housing having an outward facing spherical surface mating in sliding relation with the internal surface of said elastomeric ring, and
e. means to secure said collar to said housing.

8. In a flexible sound isolation joint for pipelines where an annular housing with a central cavity has a nipple partially submerged therein with said nipple having spherically flared end surfaces on the submerged portion, the combination which comprises:
a. an inward facing internally grooved rubber ring adhered at its outer surface to the inner surface of said flared end and internally contoured spherically with reference to a common center point spaced from said flared end and located on the longitudinal axis of said joint,
b. an elastomeric body having an assembly of concentric spherical structural rings embedded therein, with said body adhered to the outer surface of said flared end and with said rings contoured and positioned in symmetry to said common center point,
c. a collar secured to said housing encircling said nipple and adhered to the outer surface of said elastomeric body to maintain said body in position, and d. support structure in said housing having an outward facing spherical surface mating in sliding relation with the internal surface of said first elastomeric body.

9. The combination set forth in claim 8 in which seal means encircle said collar and engage said housing to provide a pressure seal therebetween.

10. A flexible joint for pipelines comprising:
a. an annular housing having an internal centrally located annular rib extending radially inwardly,
b. a hollow cylinder having an external circumferential flange resting on said rib and having exterior surfaces on both sides of said flange of spherical configuration relative to a center point on the axis of said housing,
c. two opposed nipples, each partially submerged in said housing with spherically flared end surfaces on the submerged portions,
d. inward facing internally grooved rubber rings adhered at outer surfaces thereof to the inner surfaces of said flared ends and internally contoured spherically with reference to said center point and operating in sliding relation over the surfaces of said hollow cylinder,
e. two elastomeric bodies each having an assembly of concentric spherical structural rings embedded therein, each said body adhered to the outer surface of one of said flared ends and with said rings contoured and positioned in symmetry to said center point, and
f. two collars, one secured to each end of said housing and encircling one of said nipples and adhered to the outer surface of one of said elastomeric bodies to maintain said bodies in position.

11. The combination set forth in claim 10 wherein grooves are formed in the inner surfaces of said rubber rings to equalize pressure across said rings and apply internal pipe pressure to said elastomeric bodies.

12. The combination set forth in claim 10 in which the inner and outer surfaces of said flared ends are concentrically spherical relative to said center point.

13. The combination set forth in claim 10 in which said hollow cylinder has an inner bore corresponding with the inner bores of said nipples.

14. A flexible joint for pipelines where a cylindrical housing has a central cavity and a pair of nipples partially submerged at opposite ends in said housing with said nipples having flared ends on the submerged portions, the combination which comprises:
a. two elastomeric rings respectively adhered to the inner surfaces of said flared ends and internally contoured spherically with reference to a common center point which point is spaced from said flared ends and is located on the longitudinal axis of said housing,
b. two elastomeric bodies each having an assembly of concentric spherical rings embedded therein, with said bodies respectively adhered to the outer surfaces of said flared ends and with said rings contoured and positioned in symmetry to said common center point,
c. two collars, one encircling each of said nipples and engaging the outer surface of said elastomeric bodies to maintain said bodies in position,
d. support structure in said housing having an outward facing spherical surface mating in sliding relation with the internal surfaces of said elastomeric rings, and
e. means to secure said collars to opposite ends of said housing.

* * * * *

UNITED STATES PATENT AND TRADEMARK OFFICE
CERTIFICATE OF CORRECTION

PATENT NO. : 4,068,864
DATED : Jan. 17, 1978
INVENTOR(S) : John T. Herbert et al.

It is certified that error appears in the above-identified patent and that said Letters Patent are hereby corrected as shown below:

Figure 3, "10x" should be --10z--.
Figure 4, reference character "100" should be --200--.

Signed and Sealed this

Twentieth Day of June 1978

[SEAL]

Attest:

RUTH C. MASON
*Attesting Officer*

DONALD W. BANNER
*Commissioner of Patents and Trademarks*